United States Patent
Barr et al.

(10) Patent No.: US 6,254,266 B1
(45) Date of Patent: *Jul. 3, 2001

(54) FLOATING RING MIXER FOR EXTRUDER

(75) Inventors: Robert A. Barr, 14161 Hwy. 189/191, MM 141.3, Bondurant, WY (US) 82922; Jeffrey A. Myers, 7724 Kingsley, Onsted, MI (US) 49265

(73) Assignees: Robert A. Barr, Virginia Beach, VA (US); Jeffrey A. Myers, Onsted, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,946

(22) Filed: Nov. 12, 1998

Related U.S. Application Data

(63) Continuation-in-part of application No. 09/083,190, filed on May 22, 1998, now Pat. No. 5,988,866.

(51) Int. Cl.[7] ........................................ B29B 7/58
(52) U.S. Cl. ............................... 366/82; 366/78
(58) Field of Search .......................... 366/79–82, 280, 366/78, 289, 88–90; 425/207, 209, 559, 562

(56) References Cited

U.S. PATENT DOCUMENTS

| | | | |
|---|---|---|---|
| 3,239,882 | * | 3/1966 | Yokana . |
| 3,698,694 | * | 10/1972 | Zeug et al. . |
| 3,942,773 | * | 3/1976 | Csongor . |
| 4,057,379 | * | 11/1977 | Sato . |
| 4,541,982 | * | 9/1985 | Upmeier . |
| 4,779,989 | * | 10/1988 | Barr . |
| 5,013,233 | * | 5/1991 | Semmekrot . |
| 5,158,784 | * | 10/1992 | Semmekrot . |
| 5,267,788 | * | 12/1993 | Rockstedt . |
| 5,599,096 | * | 2/1997 | Rog ........................................ 366/78 |
| 5,988,866 | * | 11/1999 | Barr ........................................ 366/82 |

FOREIGN PATENT DOCUMENTS

| | | | |
|---|---|---|---|
| 1 475 216 | | 6/1977 | (GB) . |
| 2110946 | * | 6/1983 | (GB) ........................................ 366/82 |

OTHER PUBLICATIONS

Abstract and drawings for German patent DL 0155504 (Jun. 16, 1982).

* cited by examiner

*Primary Examiner*—Charles E. Cooley
(74) *Attorney, Agent, or Firm*—Jacobson, Price, Holman & Stern, PLLC

(57) ABSTRACT

An extruder-mixer has a plurality of rotor rings provided on the downstream end of a motor driven extruder shaft mounted for rotation in a conventional heated barrel or stator. The rings comprise a plurality of spaced driven rotor rings spaced apart from each other and a plurality of non-driven but rotatable floating rings interleaved between each pair of driven rotor rings. Both rings have parallel upstream and downstream faces between which polymer flow passageways extend so that the polymer melt moves downstream first through one type of ring followed by movement through the other type of ring and the viscosity of the melt causes the rotatable floating rings to be rotated by the driven rings at a slower speed than the driven rings so that shearing force on the melt effects mixing of the melt.

8 Claims, 1 Drawing Sheet

FLOATING RING MIXER FOR EXTRUDER

RELATED APPLICATION

This application is a continuation-in-part of earlier application Ser. No. 09/083,190, filed May 22, 1998, now U.S. Pat. No. 5,988,866, issued Nov. 23, 1999.

BACKGROUND OF THE INVENTION

The present invention is in the field of polymer extruders and mixers for use in connection with providing high pressure polymer melts for injection moulding and extrusion and the like.

It is well known in the art to provide a polymer melt mixer in a heated extruder barrel, sometimes referred to as a stator, including a bore defining a cylindrical internal chamber in which a screw rotor is axially positioned for a rotation within and with respect to the cylindrical chamber. It is also conventional to have the upstream portion of the rotor comprise a driven rotary screw member for feeding the polymer components along the length of the rotor or barrel to a downstream portion which provides mixing of the melted components prior to injection of the polymer melt into a die or the like. The polymer melt injection is effected by moving the rotor in a downstream direction to force the viscous polymer melt constituents from the barrel out through an opening communicating with the interior of a die or the like. A device of the foregoing type is exemplified in prior U.S. Pat. No. 5,013,233.

It is extremely desirable that the polymer melt be thoroughly mixed following melting so as to achieve optimum uniformity of structure in the finished product produced by the injection molding operation. A number of different approaches have been suggested for achieving improved polymer melt mixing as evidenced by the following discussed prior art.

The Semmekrot U.S. Pat. Nos. 5,013,233 and 5,158,784 disclose a dimpled downstream rotor portion having cavities 22, 23 surrounded by a mixing ring or sleeve 9 having radial openings through which the polymer melt moves to and from the rotor dimples as it works its way from the upstream to the downstream end of the apparatus. Mixing occurs between cavities 22, 23 of the rotor and mixing ring 9 which is arranged for free rotation about the rotor of the Semmekorot device. The mixing ring or sleeve 9 is provided with an annular valve body 17 that coacts with a valve seat 18 on the rotor to prevent reverse flow of polymer melt in an upstream direction beyond a valve seat 18 during the injection process.

Another approach is revealed in Upmeier U.S. Pat. No. 4,541,982 which discloses a polymer melt extruder employing multiple fixedly positioned distributing disks positioned one behind the other in alignment with each other to effect a plurality of flow dividing mixing operations. The disks are arranged as stationary structures through which melt flow occurs in serial manner.

Sato U.S. Pat. No. 4,057,379 discloses an extruder having a driven screw type extruder screw 6 which forces melt material to be extruded through a driven rotating disk 12 having holes 14 into a stationary disk 16 having holes 26 and which is spaced from contact with the driven rotating disk.

West German DL 0155, 504 of Elektroger discloses a static mixing device for injection molding having plurality of discs 3 having flow through apertures 4 for producing turbulence and effecting mixing of polymer melt. Each of the discs is separated from the next adjacent disc by spacers to provide chambers between the discs. The discs and spacers are firmly clamped together so as to prevent them from rotating relative to each other.

British Patent No. 1,475,216 discloses a driven cylindrical rotor cooperating with a plurality of inner and outer profile rings for cooperation with the rotor for effecting mixing of polymer melt.

Applicant's earlier U.S. Pat. No. 4,779,989 discloses a transfer mixer assembly for use with an extruder screw employing a stator in which a rotor body 36 having grooves 37 and 42 is positioned for cooperation in effecting mixing.

While some of the known prior art devices have provided fairly satisfactory mixing results, there have remained a number of problems including inadequate mixing performance and the high cost of fabrication and maintenance due to the complexity of some of the devices.

Therefore, it is a primary object of the present invention to provide a new and improved mixer and/or mixer-intruder that provides enhanced mixing results, is economical to fabricate and maintain and is reliable and easy to use.

SUMMARY OF THE INVENTION

Achievement of the foregoing objects is enabled by the preferred embodiment of the invention by the provision of a plurality of rotor rings provided on the downstream end of an extruder shaft mounted for rotation in a conventional heated barrel or stator. The upstream portion of the extruder comprises a conventional screw construction of spiral shape provided on the extruder shaft which is rotated by motor means so as to drive the polymer melt in a downstream direction toward the rotor rings.

The rings are of two different types, namely, a plurality of spaced driven rotor rings spaced apart from each other along the length of an extension of the shaft and a plurality of non-driven floating rings interleaved between each pair of rotor rings. The rotor driven rings are mounted on a rotor sleeve keyed to the shaft so as to be rotated by the shaft. Both the driven rotor rings and the floating rings have parallel upstream and downstream faces between which polymer flow passageways extend so that the polymer melt moves first through one type of ring followed by movement through the other type of ring toward the downstream end of the barrel.

The polymer flow passageways are arranged in their respective rings in concentric circles with respect to the axes of the shaft and the rings which are coaxial. The polymer passageways of both the driven rotor rings and the floating rings are alignable with each other, however, such alignment is only momentary since the floating rings and driven rings rotate at different speeds relative to each other. The speed differential is achieved because the floating rings have an outer periphery in the form of a cylindrical surface which contacts the inner cylindrical surface of the extrusion chamber so that there is some, but not absolute, frictional resistance to rotation of the floating rings.

In operation, the rotation of the extruder shaft results in rotation of the extruder screw and the driven rotor rings through which viscous polymer melt is forced by rotational operation of the extruder screw to move polymer melt through the polymer flow passageways of the first or upstream driven ring to enter the polymer flow passageways of a next adjacent downstream floating ring. The polymer melt passes through the polymer flow apertures of the next adjacent floating ring and into the polymer melt passageways of the second driven rotor ring which is rotating at the same speed as the first driven rotor ring which relationship adds to the rotational force applied to the floating ring. However, since the polymer melt is viscous, the rotation of the driven lings causes the viscous polymer melt to create a driving rotational force on the floating rings which is partially resisted by the frictional contact of the outer periphery of the floating ring with the cylindrical surface of the barrel in which the entire assembly is positioned. Consequently, there is relative rotary motion between the upstream driven rotor ring and the next adjacent floating rotor ring which creates a shearing force on the polymer melt to provide a substantial and effective mixing of the polymer melt so that by the time it reaches the downstream end of the mixing chamber, the polymer melt has been thoroughly mixed.

The upstream driven rotor ring is provided with a conical valve surface which during the initial portion of each cycle of operation is spaced from an identical conical valve surface on the downstream end of the screw shaft so that the space between the two conical valve surfaces comprises an annular polymer infeed aperture through which the polymer melt moves from the screw into the mixing chamber to pass through the driven rotor rings and the floating rings. However, when the shaft and the driven extruder screw begin to move toward the downstream end of the chamber to initiate an extrusion operation, the conical valve surface on the downstream end of the screw shaft moves into sealing contact with the conical valve surface on the upstream driven rotor ring to prevent back flow of polymer melt toward the screw during subsequent movement of the seals, the shaft and the rotor rings move in unison toward the downstream end of the chamber to effect discharge of the polymer melt into the die.

DESCRIPTION OF THE PREFERRED EMBODIMENTS

Figure 1:
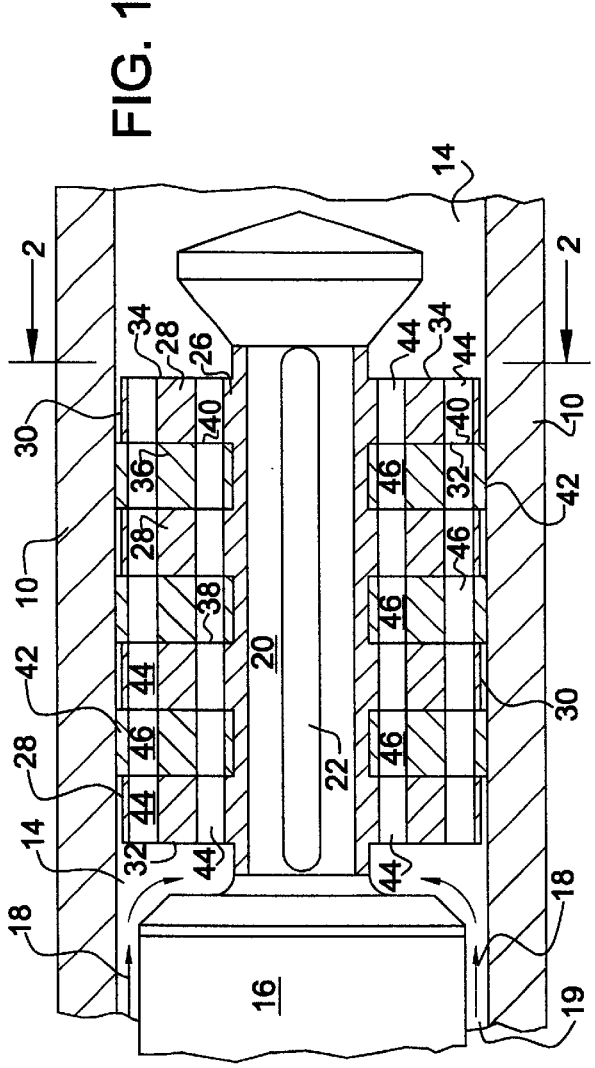
FIG. 1 is a bisecting sectional view of a first embodiment of the invention illustrating the downstream end of the extruder screw and the mixing section components.

Attention is initially invited to FIG. 1 of the drawings which illustrates the first, and least complex, embodiment of the invention. The primary components of the first embodiment comprise a heated barrel or stator 10 having a cylindrical bore surface 12 which defines a cylindrical chamber 14 having a longitudinal axis coextensive with the center of cylindrical surface 12. A conventional power driven extruder screw 16 is coaxially positioned with respect to cylindrical bore 12 in chamber 14 and is rotated about its axis in conventional well known manner by power drive means (not shown). The extruder screw 16, can, for example, be of the types shown in U.S. Pat. Nos. 4,779,989; 5,158,784 or 5,013,233. However, it should be understood that the invention is not limited to the foregoing types of extruder screws and a large number of conventional extruder screws and drive arrangements for same could be employed in practice of the invention.

Figure 2:
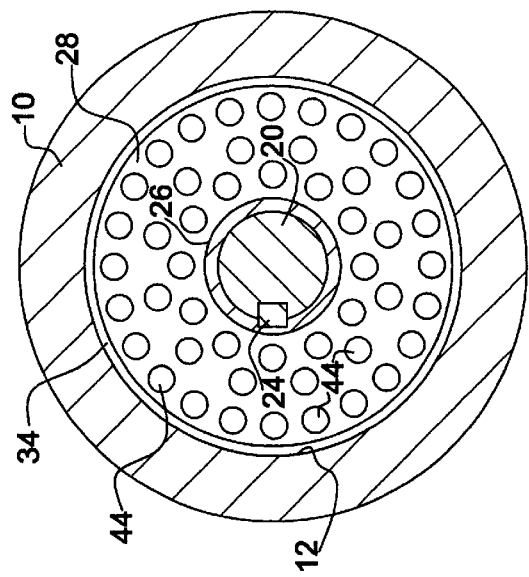
FIG. 2 is a sectional view taken along lines 2—2 of FIG. 1.

Additionally, the extruder screw is capable of being moved to the right in the downstream direction for effecting injection of the polymer melt with such movement being effected by conventional piston means such as shown in FIG. 2 of U.S. Pat. No. 5,013,233. Additionally, it should be understood that rotation of the power driven extruder screw 16 effects the flow of polymer melt in the direction of arrows 18 from left to right through annular infeed opening 19 as shown in FIG. 1. The left to right flow of the polymer melt is in a downstream direction and the term "downstream" means to the right and the term "upstream" means to the left as shown in FIG. 1. It should also be understood that the extruder screw includes an outwardly extending spiral screw member such as that shown in U.S. Pat. No. 5,013,233 but which is not illustrated in the drawings for the sake of clarity.

A driven shaft extension 20 extends in the down stream direction from the downstream end of the power driven extruder screw 16 and includes a key slot 22 in which a drive key 24 is positioned. The outer portion of drive key 24 is positioned in a slot in a rotor sleeve 26 so as to effect rotation of rotor sleeve 26. A plurality of driven rotor rings 28 extend radially outward from rotor sleeve 26 in a unitary manner as shown in FIG. 1. Each driven rotor ring 28 has an outer cylindrical surface 30 spaced from cylindrical bore surface 12 of barrel 10 and an upstream face 32 and a downstream face 34. Thus, rotation of rotor sleeve 26 easily effects driven rotation of the driven rotor rings 28 in an obvious manner without any frictional drag from barrel 10.

A plurality of floating rings 36 are also provided on rotor sleeve 26 with the floating rings 36 being interleaved with the driven rotor rings 28. However, the floating rings 36 are not driven by rotor sleeve 26 but are instead mounted so as to be capable of rotation relative to rotor sleeve 26. Each floating ring 36 has an upstream face 38 which faces the downstream face 34 of an adjacent driven rotor ring 28. Similarly, each floating ring has a downstream face 40 which faces an upstream face 32 of the next adjacent driven rotor ring 28 as shown in FIG. 1. Additionally, each floating ring 36 has an outer cylindrical surface 42 defining its outer periphery and lightly engaging the inner cylindrical surface 12 of the barrel or stator 10. The light engagement of surfaces 42 and 12 creates frictional resistance against rotation of the floating rings 36; however, the frictional resistance is not of great magnitude and can be overcome by the rotational movement of the polymer melt moving between each driven rotor ring 28 and adjacent floating rings 36 in a manner to be discussed. Additionally, it should be noted that there is loose clearance between the facing ring surfaces 34, 38 and 32, 40 so that there is a minimal amount of friction between rings 28 at 36 so that driven rotor rings 28 can rotate without any substantial resistance from floating rings 36.

Each of the driven rotor rings 28 is provided with a plurality of polymer flow passageways 44 which extend between their upstream face 32 and their downstream face 34 as shown in FIG. 1. The polymer flow passageways 44 are arranged in three concentric circles comprising an inner circle most closely adjacent to rotor sleeve 26, an intermediate circle adjacent the inner circle and an outermost circle adjacent the outer periphery of each driven rotor ring as shown in FIG. 2.

The floating rings 36 are similarly provided with polymer flow passageways 46 which can be precisely aligned with the passageways 44 of the driven rotor rings 28. However, it should be understood that relative rotation of floating rings 36 with respect to driven rotor rings 28 causes such total alignment of the polymer flow apertures to be momentary.

In operation, the power driven extruder screw 16, driven shaft 20, drive key 24 and rotor sleeve 26 are rotated by conventional electric motor drive means and such rotation consequently results in rotation of the driven rotor rings 28 in an obvious manner. Rotation of the power driven extruder screw 16 causes polymer melt to flow in the direction of arrows 18 and into the space immediately upstream of the power driven rotor ring 28 facing the screw 16 as shown in FIG. 1. The polymer melt flows into the polymer flow passageways 44 of the most upstream power driven rotor ring 28 and moves through polymer passageway 44 to enter into the polymer flow passageway 46 of the floating ring 36 immediately downstream of the most upstream driven rotor ring 28. However, the frictional engagement of the outer cylindrical surface 42 of the floating rings 36 causes some resistance to rotation of the floating rings so that the power driven rotor rings 28 consequently rotate at a greater velocity than the floating rings 36. The speed of the polymer melt is quite substantial so that the polymer melt creates rotational force on floating rings 36 sufficient to overcome the friction between surfaces 12 and 42 and causes the floating rings to rotate. However, the frictional drag between outer surface 42 of the floating rings and the barrel inner surface 12 causes floating rings 36 to rotate at a slower speed than the speed of rotation of the driven rotor rings 28.

The fact that the floating rings and the power driven rotor rings 28 rotate at different speeds results in shear forces acting on the polymer melt moving between rings 28 and 36 to effect substantial mixing of the polymer melt so that the polymer melt is through mixing when it emerges from the mixing section at the downstream side of the right hand power driven rotor ring 28. The power driven extruder screw 16, shaft 20, rings 28 and 36 are all then shifted to the right by conventional drive means to effect ejection of the polymer melt from chamber 14 into a injection mold, not shown, in a well known manner. At the completion of the injection stroke, the entire extruder screw etc. assembly is then reciprocated back to the starting position to permit the initiation of a subsequent cycle of operation.

Figure 3:
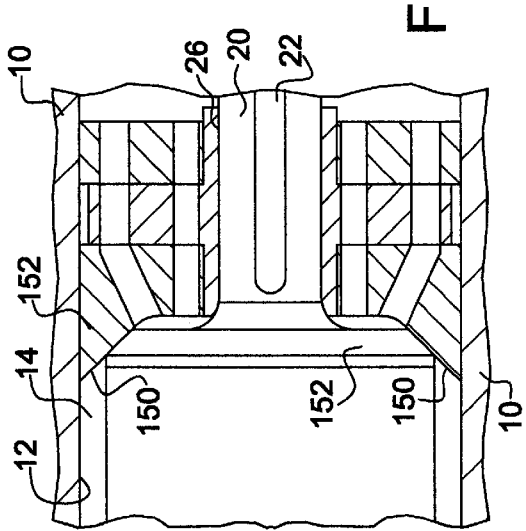
FIG. 3 is a bisecting sectional view of a second embodiment illustrating the auger screw in its upstream position during the initial stage in a cycle of operation in which the melt polymer is being fed through an annular passageway into the rotor rings.
Figure 4:
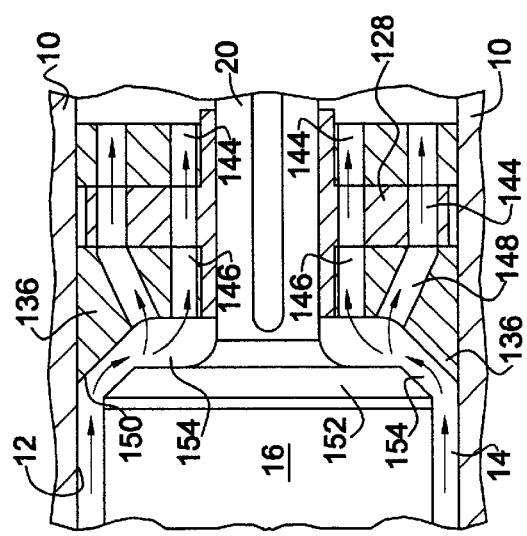
FIG. 4 is bisecting section view similar to FIG. 3 but illustrating the auger and shaft in the closed position assumed shortly after the beginning of an injection cycle in which the annular passageway is closed by positioning of the downstream end of the auger screw against the upstream facing surface of the most upstream ring of the ring assembly.

A second embodiment of the invention illustrated in FIGS. 3 and 4 differs from the first embodiment in that the initial movement of the power driven extruder screw 16 from its fully retracted position toward the downstream end of the barrel serves to effect closure of the annular infeed opening 19 between the extruder screw and the mixing chamber to preclude reverse flowback of polymer melt into the extruder screw. The foregoing results are achieved by the employment of a modified floating ring 136 positioned in facing relation to a conical valve surface 152 on the downstream end of power driven extruder screw 16 instead of a driven ring as employed in the embodiment of FIGS. 1 and 2.

The upstream or forward face of the modified floating ring 136 includes a conical ring valve surface 150 which faces the conical through valve surface 152 as shown in FIG. 3. The modified floating ring 136 includes a plurality of inner ring polymer flow passageways 146 which communicate with the next adjacent downstream ring polymer flow passageways 144 of driven rotor ring 128 which is identical to the driven rotor ring 28 of the first embodiment. The modified floating ring 136 also includes a plurality of canted polymer flow passageways 148 which communicate with the outer most ring polymer flow passageways 144 of the driven ring member 128. It should also be observed that the modified floating ring 136 also has a group of intermediately positioned polymer flow passageways aligned with the intermediate group of polymer flow passageways of the next adjacent ring but which is not illustrated in the drawings.

During the initial portion of a cycle of operation, the components are positioned so that the valve surfaces 150 and 152 are spaced from each other as shown in FIG. 3. The aforementioned positioning of the valve components provides for the open annular infeed passageway 154 of annular shape between the valve surfaces which permits the inflow of polymer melt in the manner shown by the arrows in FIG. 3.

When the injection phase of the cycle begins, the power driven extruder screw 16 is moved to the right so that valve surfaces 150 and 152 are forcefully engaged with each other to close annular inflow passageway 154 to prevent reverse flow of polymer melt back toward the auger during the high pressure injection operation.

In both embodiments, the flow of polymer melt through the polymer flow passageways 44 and 144 enters the passageways of the floating rings 36 and 136, respectively, to effect rotational drive to the floating ring 36 and 136 due to the fact that the driven rings are rotating faster than the floating rings. The polymer melt is consequently subjected to a shearing action due to the speed differential between the two different types of rings and the mixing of the polymer melt is consequently enhanced. If the polymer melt is of high viscosity, the speed of rotation differential between the floating ring and the driven ring will be less than it will be if the viscosity was of a reduced value. It should also be noted that discharge of the polymer melt through the passageways on the downstream side of the floating rings enters a driven rotor ring that is rotating at a greater velocity than the speed of rotation of the floating ring so that shearing mixing of the polymer melt is effected at each transfer point from the floating rings to the driven rings. Thus, the polymer melt which reaches the downstream end of the barrel is assured of being uniformly mixed.

Modifications and variations of the above-described embodiments of the present invention are possible, as will be appreciated by those skilled in the art in light of the above teachings. For example, the number of rings, the shape and number of the ring passageways and other aspects of the preferred embodiment can be modified without departing from the spirit and scope of the invention. It is therefore to be understood that, within the scope of the appended claims and their equivalents, the invention may be practiced otherwise than as specifically described.

What is claimed is:

1. A polymer melt mixer for an extruder assembly having a barrel including a cylindrical bore defining a cylindrical chamber in which a driven extruder screw is positioned for rotation about its axis to move polymer melt in a downstream direction through said chamber, said mixer comprising:

a driven shaft adapted to be attached to a downstream end of and driven in rotation by the extruder screw;

a least one driven rotor ring coaxial with said driven shaft and mounted on said driven shaft for rotation therewith about a longitudinal axis of said driven shaft, said one driven rotor ring having a pair of axially spaced, radially extending faces;

a least one floating ring coaxial with said driven shaft and mounted on said driven shaft for rotation relative thereto, said one floating ring having a pair of axially spaced, radially extending faces, said one floating ring being positioned adjacent to said one driven rotor ring with adjacent ones of said faces being spaced apart; and said one driven rotor ring and said one floating ring each having a plurality of polymer flow passageways extending therethrough between said axially spaced faces whereby when said driven shaft is attached to a downstream end of the extruder screw in the cylindrical chamber and the extruder screw is driven in rotation causing polymer melt to flow through said flow passageways, said driven shaft and said one driven rotor ring are drivingly rotated by the extruder screw and said one floating ring is free to rotate at a speed less than a speed of rotation of said one driven rotor ring while said polymer melt is being further mixed due to different speeds of rotation between said one driven rotor ring and said one floating ring.

2. The mixer according to claim 1 wherein said one floating ring has an outer peripheral surface in sliding contact with the cylindrical bore of the barrel so as to create resistance to, but not preclude, rotation of said one floating ring.

3. The mixer according to claim 1 wherein said one driven rotor ring is drivingly connected to said driven shaft by a rotor sleeve positioned on said driven shaft and further including drive key means drivingly connecting said rotor sleeve to said driven shaft.

4. The mixer according to claim 1 wherein said driven shaft and the driven extruder screw are mounted for reciprocation between an upstream position and a downstream position, the driven extruder screw having a downstream end defining a screw valve surface and wherein an upstream one of said driven rotor ring faces has a ring valve surface facing the screw valve surface and wherein the screw valve surface of the extruder screw and said ring valve surface are spaced apart by an annular inflow passageway when the extruder screw is in its upstream position to permit polymer melt to flow from the extruder screw through the annular inflow passageway into said flow passageways in said one driven rotor ring and wherein the screw valve surface of the extruder screw engages said ring valve surface of said one driven rotor ring when the extruder screw is in its downstream position so that the annular inflow passageway is closed so as to preclude polymer melt reverse flow through said one driven rotor ring toward the extruder screw.

5. A polymer melt mixer for an extruder assembly having a barrel including a cylindrical bore defining a cylindrical chamber in which a driven extruder screw is positioned for rotation about its axis to move polymer melt in a downstream direction through said chamber, said mixer comprising:

a driven shaft adapted to be attached to a downstream end of and driven in rotation by the extruder screw;

a least two driven rotor rings coaxial with said driven shaft and mounted on said driven shaft in spaced apart relationship for rotation therewith about a longitudinal axis of said driven shaft, said driven rotor rings each having a pair of axially spaced, radially extending faces;

a least one floating ring coaxial with said driven shaft and mounted on said driven shaft for rotation relative thereto, said one floating ring having a pair of axially spaced, radially extending faces, said one floating ring being positioned between said two driven rotor rings with adjacent ones of said faces being spaced apart; and said two driven rotor rings and said one floating ring each having a plurality of polymer flow passageways extending therethrough between said axially spaced faces whereby when said driven shaft is attached to a downstream end of the extruder screw in the cylindrical chamber and the extruder screw is driven in rotation causing polymer melt to flow through said flow passageways, said driven shaft and said two driven rotor rings are drivingly rotated by the extruder screw and said one floating ring is free to rotate at a speed less than a speed of rotation of said two driven rotor rings while said polymer melt is being further mixed due to different speeds of rotation between said two driven rotor rings and said one floating ring.

6. The mixer according to claim 5 wherein said one floating ring has an outer peripheral surface in sliding contact with the cylindrical bore of the barrel so as to create resistance to, but not preclude, rotation of said one floating ring.

7. The mixer according to claim 5 wherein said two driven rotor rings are drivingly connected to said driven shaft by a rotor sleeve positioned on said driven shaft and further including drive key means drivingly connecting said rotor sleeve to said driven shaft.

8. The mixer according to claim 5 wherein said driven shaft and the driven extruder screw are mounted for reciprocation between an upstream position and a downstream position, the driven extruder screw having a downstream end defining a screw valve surface and wherein an upstream one of an adjacent one of said driven rotor ring faces has a ring valve surface facing the screw valve surface and wherein the screw valve surface of the extruder screw and said ring valve surface are spaced apart by an annular inflow passageway when the extruder screw is in its upstream position to permit polymer melt to flow from the extruder screw through the annular inflow passageway into said flow passageways in said adjacent one driven rotor ring and wherein the screw valve surface of the extruder screw engages said ring valve surface of said adjacent one driven rotor ring when the extruder screw is in its downstream position so that the annular inflow passageway is closed so as to preclude polymer melt reverse flow through said adjacent one driven rotor ring toward the extruder screw.

* * * * *